(12) United States Patent
Groß et al.

(10) Patent No.: US 10,589,631 B2
(45) Date of Patent: Mar. 17, 2020

(54) INSTALLATION FOR CHARGING ELECTRIC CARS

(71) Applicant: Dr. Ing. h.c. F. Porsche Aktiengesellschaft, Stuttgart (DE)

(72) Inventors: Manuel Groß, Hessigheim (DE); Volker Reber, Michelbach an der Bilz (DE); Stefan Götz, Forstern (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 85 days.

(21) Appl. No.: 15/988,265

(22) Filed: May 24, 2018

(65) Prior Publication Data

US 2019/0016219 A1 Jan. 17, 2019

(30) Foreign Application Priority Data

Jul. 12, 2017 (DE) .................. 10 2017 115 641

(51) Int. Cl.

| | |
|---|---|
| H01M 10/46 | (2006.01) |
| B60L 11/18 | (2006.01) |
| H01M 10/613 | (2014.01) |
| H01M 10/625 | (2014.01) |
| H01M 10/667 | (2014.01) |
| B60L 53/51 | (2019.01) |
| B60L 53/31 | (2019.01) |
| B60L 58/26 | (2019.01) |
| B60L 53/67 | (2019.01) |
| H01M 10/6568 | (2014.01) |

(Continued)

(52) U.S. Cl.
CPC .......... *B60L 11/1825* (2013.01); *B60L 53/30* (2019.02); *B60L 53/302* (2019.02); *B60L 53/31* (2019.02); *B60L 53/51* (2019.02); *B60L 53/67* (2019.02); *B60L 58/26* (2019.02); *H01M 10/613* (2015.04); *H01M 10/625* (2015.04); *H01M 10/6568* (2015.04); *H01M 10/667* (2015.04); *H01M 10/48* (2013.01); *H01M 10/6563* (2015.04)

(58) Field of Classification Search
CPC ...... H02J 7/0013; H02J 7/0027; H02J 7/0021; H02J 7/0026
USPC ........ 320/104, 107, 109, 135, 138, 140, 150
See application file for complete search history.

(56) References Cited

U.S. PATENT DOCUMENTS

| | | | | |
|---|---|---|---|---|
| 5,341,083 | A | * | 8/1994 | Klontz .................. B60L 53/34 320/109 |
| 2005/0046387 | A1 | * | 3/2005 | Aker ..................... H02J 7/0042 320/125 |

(Continued)

FOREIGN PATENT DOCUMENTS

| | | |
|---|---|---|
| DE | 102011082565 A1 | 3/2013 |
| FR | 2978702 A1 | 2/2013 |

*Primary Examiner* — Edward Tso
(74) *Attorney, Agent, or Firm* — RatnerPrestia

(57) ABSTRACT

An installation for charging electric cars includes the following features: charging columns, direct-current lines, rectifiers, three-phase alternating-current lines, a single-phase alternating-current line and a cooling arrangement. The direct-current lines electrically connect the charging columns to the rectifiers. The three-phase alternating-current lines electrically connect the rectifiers to a medium-voltage transformer. The single-phase alternating-current line electrically connects the medium-voltage transformer to the cooling arrangement.

10 Claims, 13 Drawing Sheets

(51) Int. Cl.
*B60L 53/30* (2019.01)
*B60L 53/302* (2019.01)
*H01M 10/48* (2006.01)
*H01M 10/6563* (2014.01)

(56) References Cited

U.S. PATENT DOCUMENTS

| | | |
|---|---|---|
| 2009/0256523 A1 | 10/2009 | Taguchi |
| 2011/0111269 A1 | 5/2011 | Tse |
| 2012/0153717 A1* | 6/2012 | Obayashi ............ B60L 11/1816 307/9.1 |
| 2014/0322570 A1 | 10/2014 | Nakamura et al. |

* cited by examiner

INSTALLATION FOR CHARGING ELECTRIC CARS

CROSS-REFERENCE TO RELATED APPLICATION

This application claims priority to German Patent Application No. DE 10 2017 115 641.0, filed Jul. 12, 2017, which is incorporated by reference herein in its entirety.

FIELD OF THE INVENTION

The present invention relates to an installation for charging electric cars.

BACKGROUND OF THE INVENTION

In electrical engineering, a charging station is any stationary apparatus or electrical installation which serves to supply energy to mobile rechargeable battery-operated devices, machines or motor vehicles by simple placement or insertion, without the energy store—for example the traction battery of an electric car—having to be removed. Charging stations for electric cars are sometimes also called "electricity charging stations" and can comprise a plurality of charging points.

In particular, high-performance direct-current charging systems such as the so-called combined charging system (CCS) which is widespread throughout Europe are known in this respect. During direct-current charging of this generic type, direct current is fed from the charging column directly into the vehicle and, for this purpose, provided by way of a powerful rectifier from the power grid or by way of large buffer accumulators at solar charging stations. The vehicle contains a battery management system which communicates with the charging column in order to adjust the current intensity or to terminate the process when a capacity limit is reached.

In this case, the power electronics are usually located in the charging column. Since the direct-current connections of the charging column are connected directly to corresponding connections of the traction battery, high charging currents can be transmitted with a low level of loss, this allowing short charging times but also generating a considerable amount of waste heat.

Different concepts for cooling charging systems for electric vehicles are also known. DE102011082565A1, which is incorporated by reference herein, for example, discloses an electric charging system for battery-operated motor vehicles which dispenses with integrating the battery module into the vehicle-side coolant/refrigerant circuit, so that heat exchange between the battery cells and an external cooling system takes place only via a mechanical interface as required during a charging process. A contact area which is fitted to the external cooling system and, as a single part, constitutes a second half of the heat exchanger, is intended to make a contribution to the external cooling system being able to be better utilized as part of a charging infrastructure, wherein a large number of vehicles can be served.

US2014322570A, which is incorporated by reference herein, relates to a battery apparatus comprising a battery which is charged using external power, a charging-related apparatus comprising a charging apparatus which is used for charging the battery, and a coolant apparatus which serves to introduce a coolant for cooling the battery and the charging apparatus into the battery apparatus and the charging-related apparatus. The first coolant apparatus is intended to allow switchover between a first state, in which the coolant is introduced into the battery apparatus, and a second state, in which the coolant is introduced into the charging-related apparatus.

FR2978702A, which is incorporated by reference herein, US2009256523A, which is incorporated by reference herein, and US2011111269A, which is incorporated by reference herein, discuss further system cooling concepts.

SUMMARY OF THE INVENTION

Described herein is an installation for charging electric cars comprising charging columns, direct-current lines, rectifiers, three-phase alternating-current lines, a single-phase alternating-current line and a cooling arrangement; the direct-current lines electrically connect the charging columns to the rectifiers, the three-phase alternating-current lines electrically connect the rectifiers to a medium-voltage transformer, and the single-phase alternating-current line electrically connects the medium-voltage transformer to the cooling arrangement.

One advantage of this solution is its centralized liquid cooling which considerably simplifies the geometric and functional arrangement of components and different equipment variants in an extremely small installation space (packaging). The invention therefore allows highly scalable power and flexible positioning on-site and also a considerable cost saving on installation and during use.

Further advantageous refinements of the invention are specified in the dependent patent claims. For example, a high degree of user acceptance can be achieved owing to low-noise and slim charging outputs in the user interaction region. In respect of availability and redundancy, a corresponding embodiment is equal to conventional solutions in this case, and may even improve these in individual cases.

Further technical advantages of the concept according to aspects of the invention include the scalability of the cooling power which allows up to six charging columns per cooling arrangement, and also the reduced space requirement by the charging columns themselves owing to the use of simple heat exchangers.

BRIEF DESCRIPTION OF THE DRAWING FIGURES

An exemplary embodiment of the invention is illustrated in the drawings and will be described in more detail in the text which follows.

FIG. 1 shows an overview of the proposed system and the cabling of said proposed system.

FIG. 2 schematically shows the cooling concept according to aspects of the invention.

DETAILED DESCRIPTION OF THE INVENTION

Figure 1:
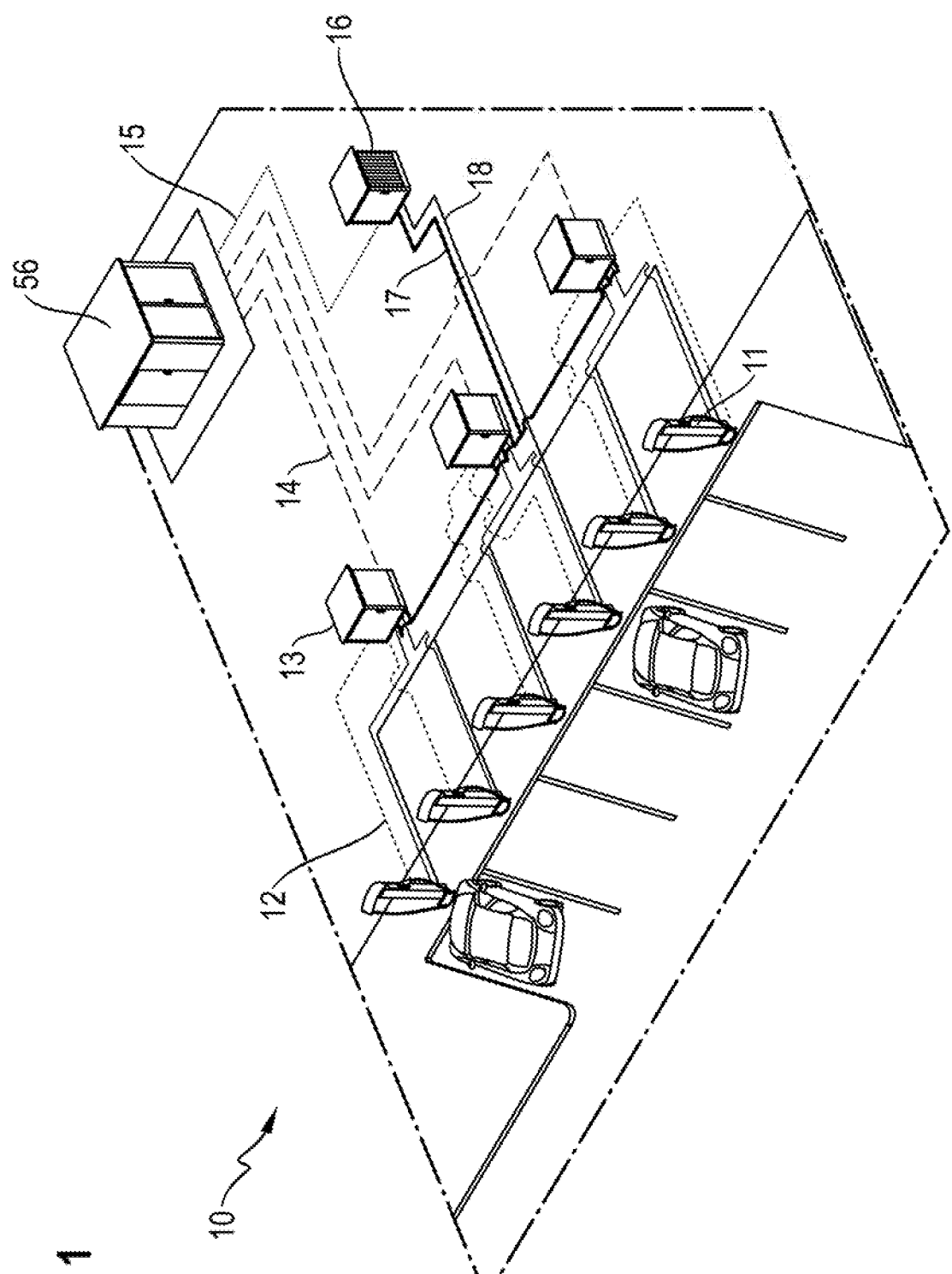

FIG. 1 illustrates the structure of an installation (10) according to aspects of the invention comprising charging columns (11), direct-current lines (12), rectifiers (13), three-phase alternating-current lines (14), a single-phase alternating-current line (15) and also a central cooling arrangement (16). The direct-current lines (12), which are designed for 800 V for example, in this case connect the charging columns (11) to the rectifiers (13) which, for their part—for example with a voltage of 480 V—are fed from a medium-voltage transformer (56) via the three-phase alternating-current lines (14) by switch panel. In addition, said medium-voltage transformer is, in turn, connected to the cooling arrangement (16) via a conventional single-phase alternating-current line (15) and supplies said cooling arrangement with a conventional domestic low voltage. In this case, the installation (10) comprises, in fluidic terms, a common primary cooling circuit (47) which connects the charging columns (11), rectifiers (13) and cooling arrangement (16) by means of a feed (18), which leads from said cooling arrangement to the charging columns (11), and a return (17), which leads from the rectifiers (13) to the cooling arrangement (16).

Figure 2:
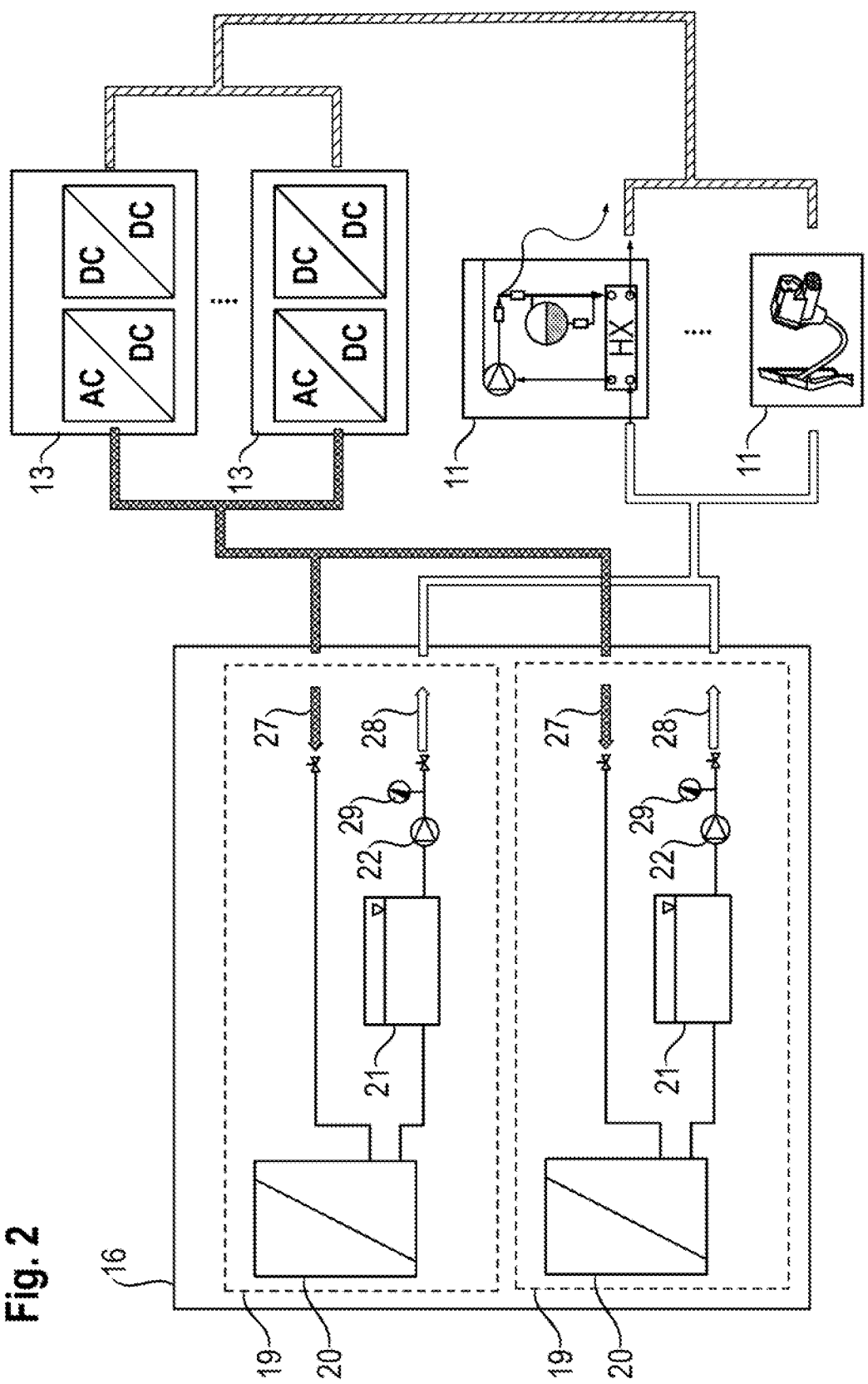

FIG. 2 illustrates the structure of this cooling arrangement (16) using a block diagram. Said figure shows a plurality of modules (19) which each comprise a fan (20), a tank (21), a pump (22) and also a coolant inlet (27) and a coolant outlet (28) which fluidically connect the respective module (19) to the rectifiers (13) and, respectively, charging columns (11). A manometer (29) which is arranged between pump (22) and coolant outlet (28) allows precise pressure control in the process.

Figure 3:
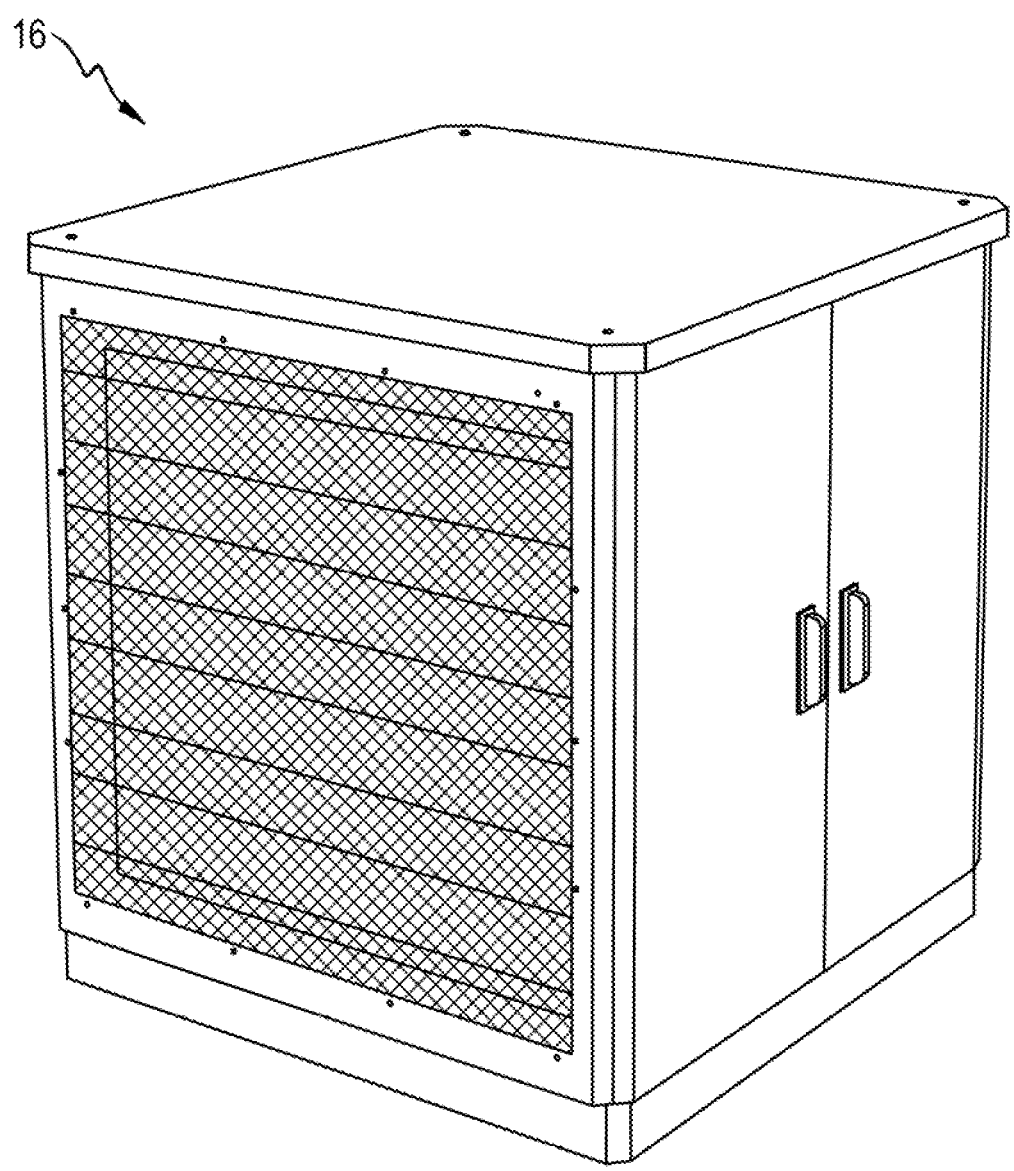
FIG. 3 shows a view of the cooling arrangement from a first viewing angle.
Figure 4:
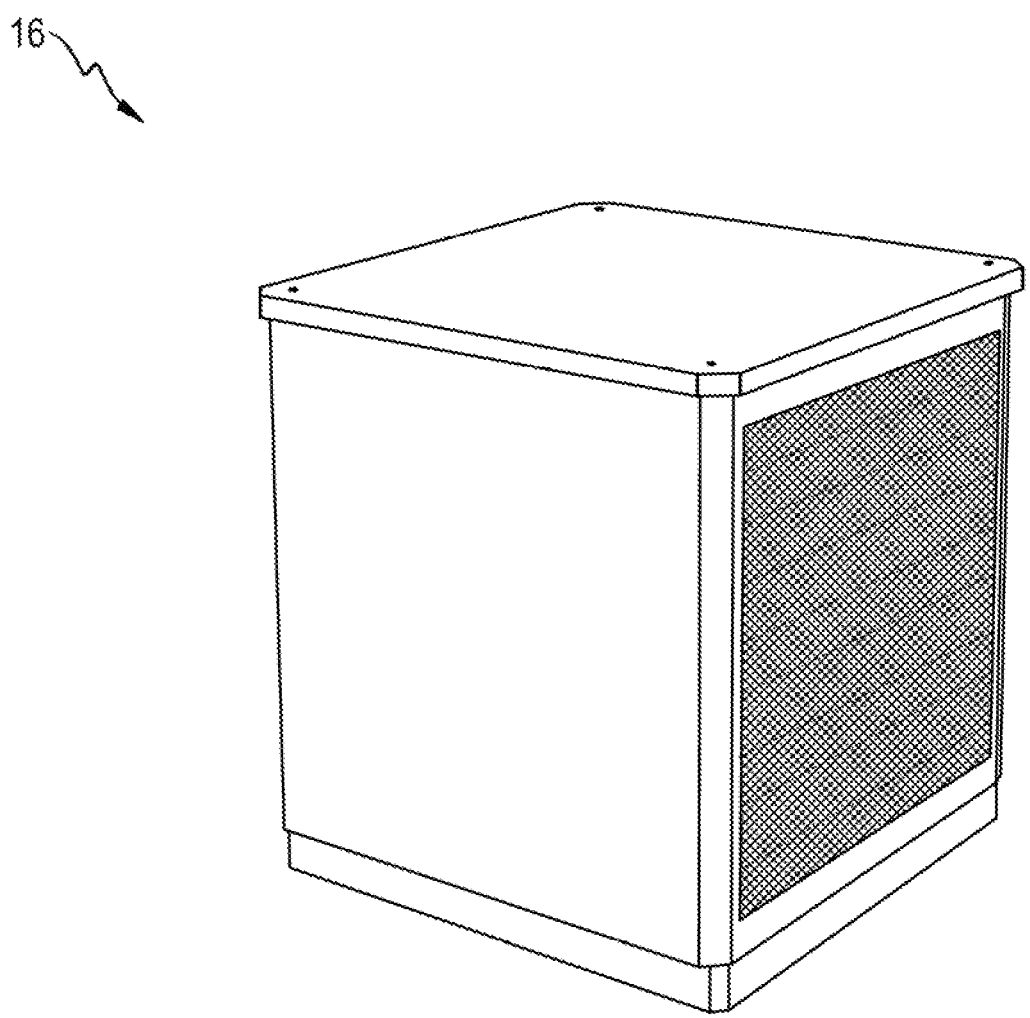
FIG. 4 shows a view of the cooling arrangement from a second viewing angle.
Figure 5:
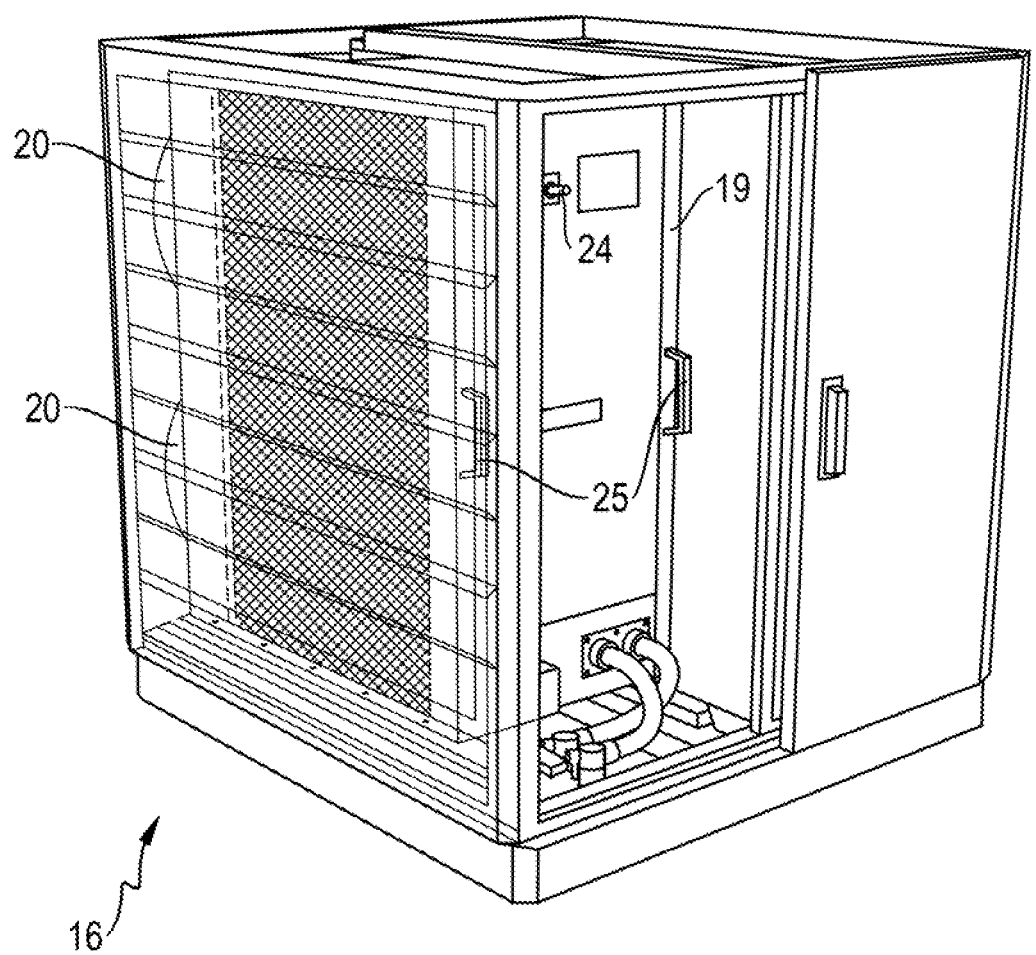
FIG. 5 shows a partially transparent view of the cooling arrangement according to FIGS. 3 and 4.
Figure 6:
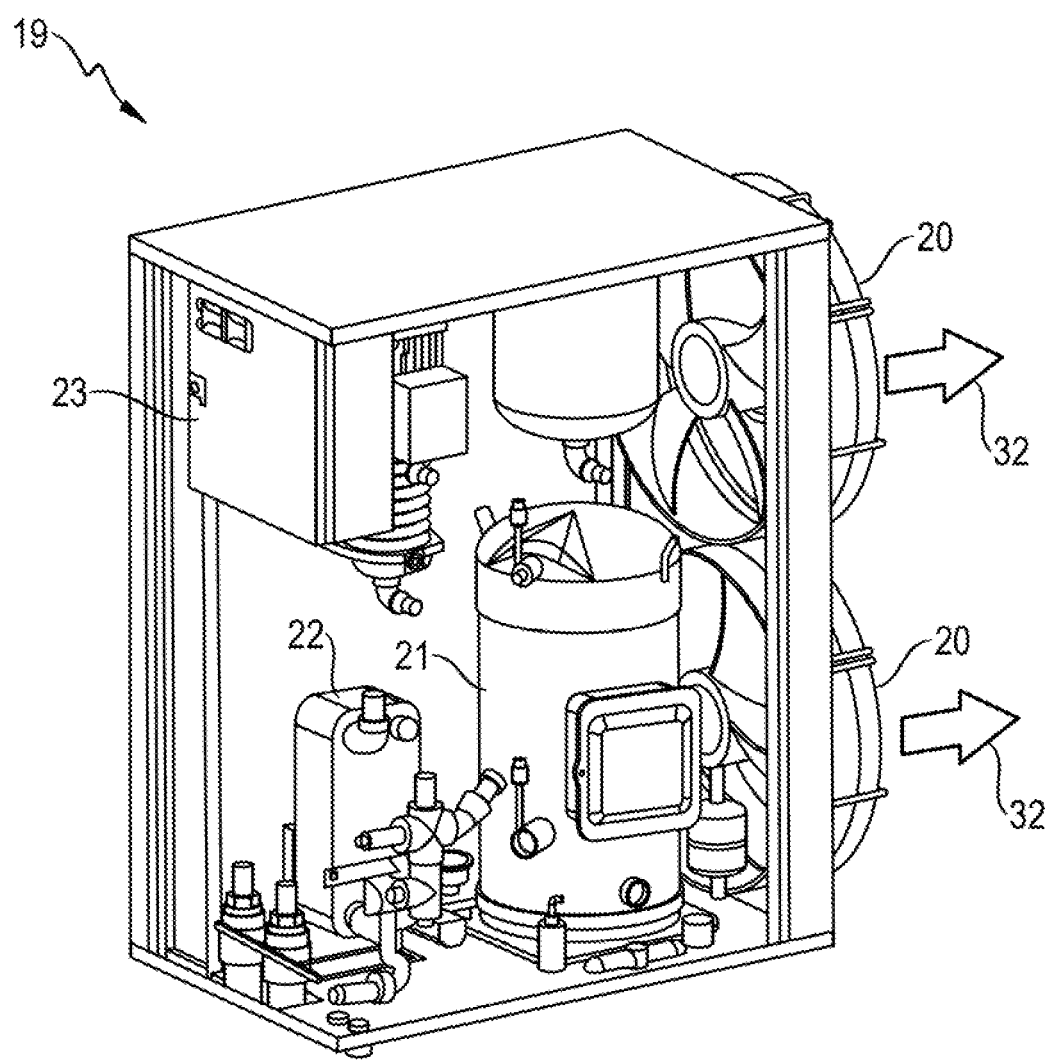
FIG. 6 shows the perspective partial section through a cooling module.

While FIGS. 3 and 4 show the cooling arrangement (16), which is of modular construction in this way, in its closed state from the view of a user, the partially transparent illustration according to FIG. 5 shows a view into the housing of said cooling arrangement. Said housing accommodates at least one module (19) and reveals its switch cabinet (23) with main switch (24) and also handles (25) and an electrical junction box (26) which, just like the switch cabinet (23), is arranged between the handles (25) on either side such that it is easily accessible and therefore easy to service.

Figure 7:
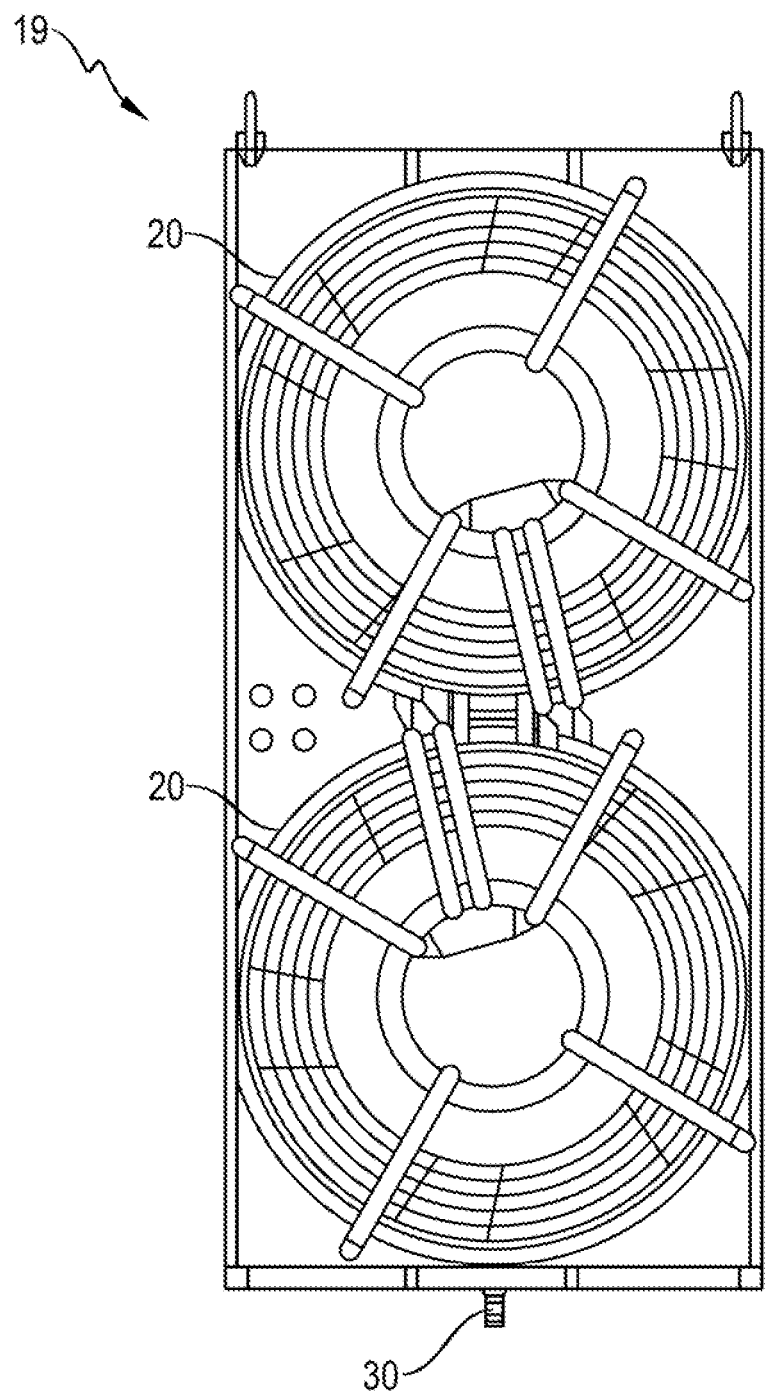
FIG. 7 shows a rear view of the module.
Figure 8:
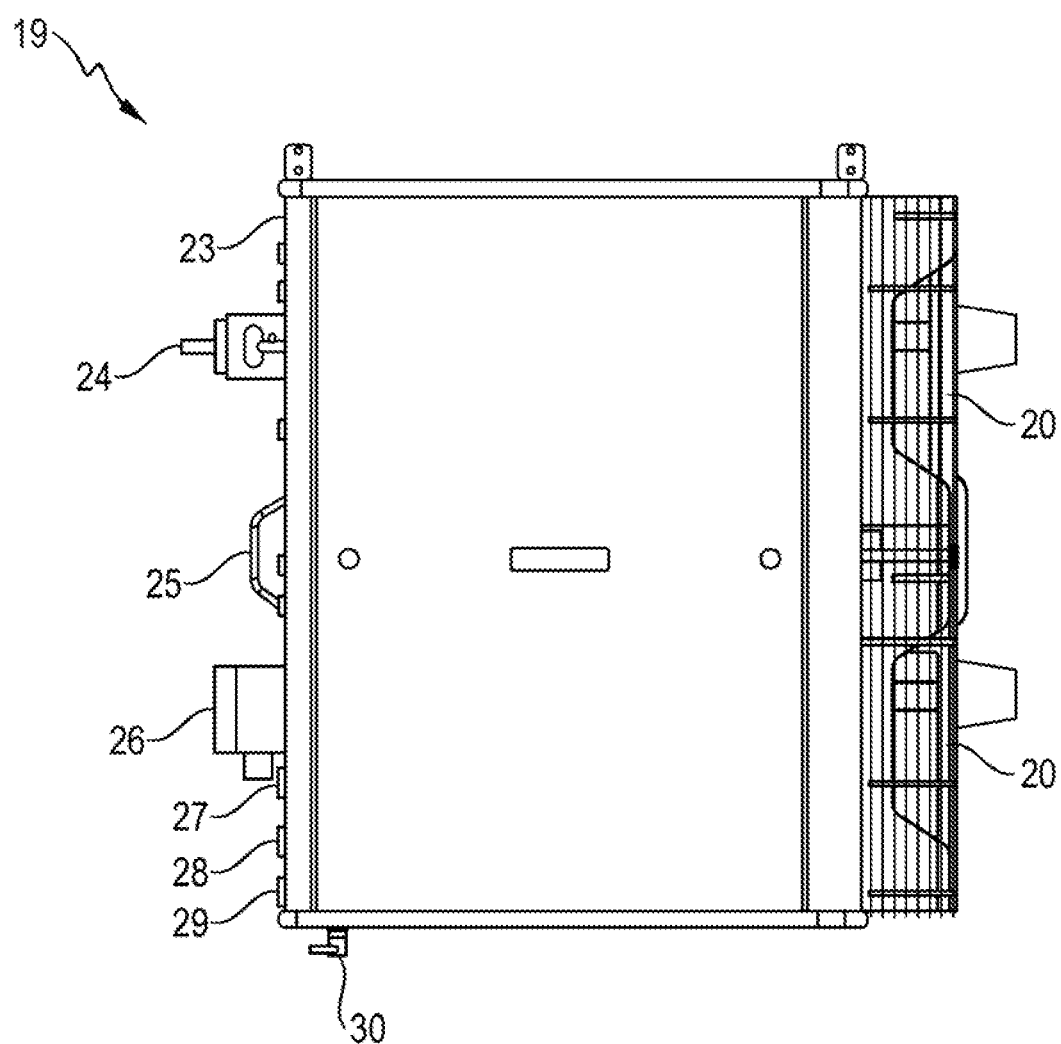
FIG. 8 shows a side view of the module.
Figure 9:
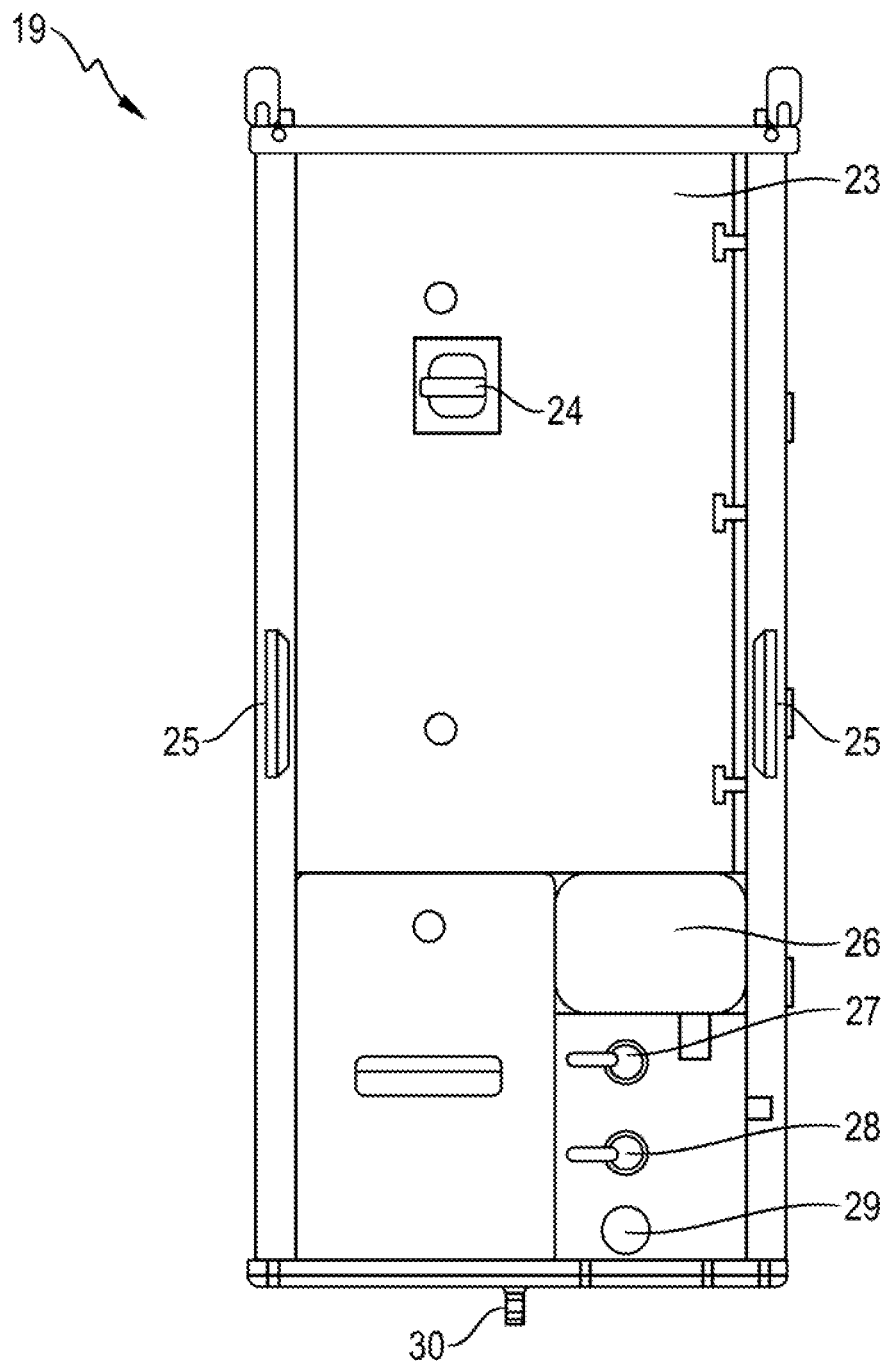
FIG. 9 shows a front view of the module.
Figure 10:
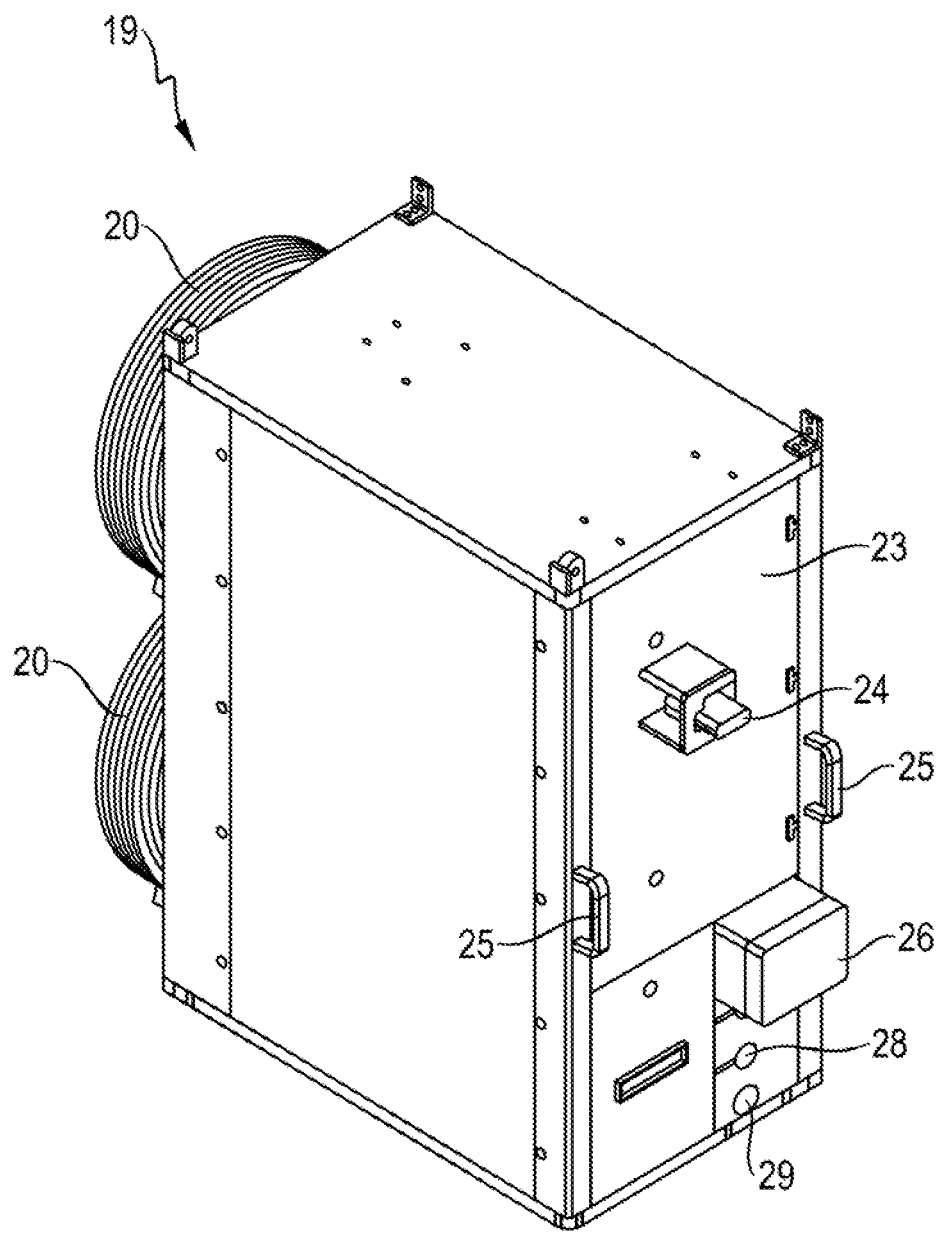
FIG. 10 shows a perspective view of the module.
Figure 11:
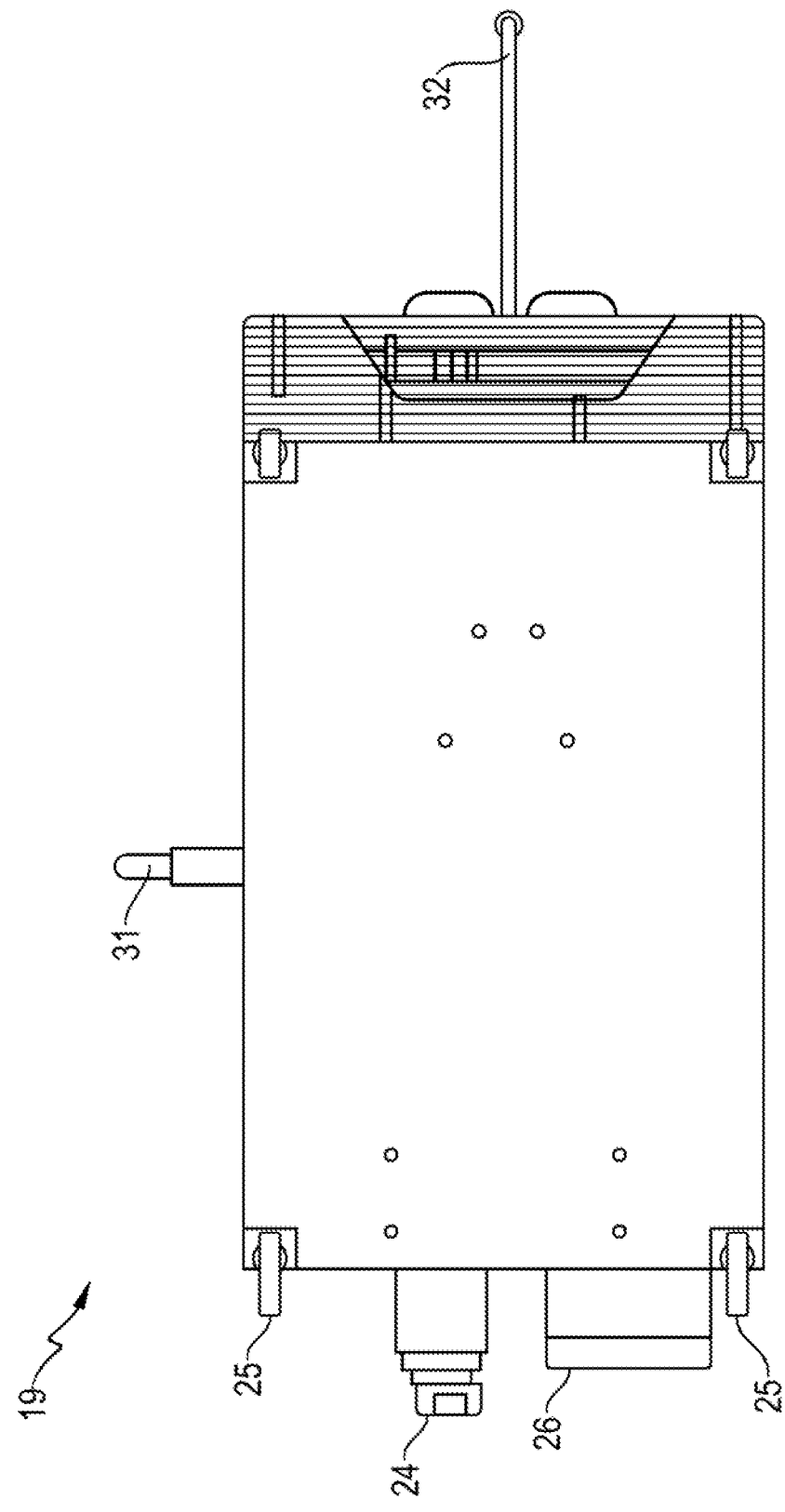
FIG. 11 shows a view of the module from below.

FIGS. 6 to 11 highlight the structural features of the module (19) itself from various viewing angles. The fan (20) of said module is, as illustrated in FIG. 11 in particular, arranged within the module (19) in such a way that the air inlet (31) and air outlet (32) of said fan are at a right angle in relation to one another. FIGS. 7 to 9 further show an overflow (30), which is close to the base, for the expansion vessel and water of condensation.

Figure 12:
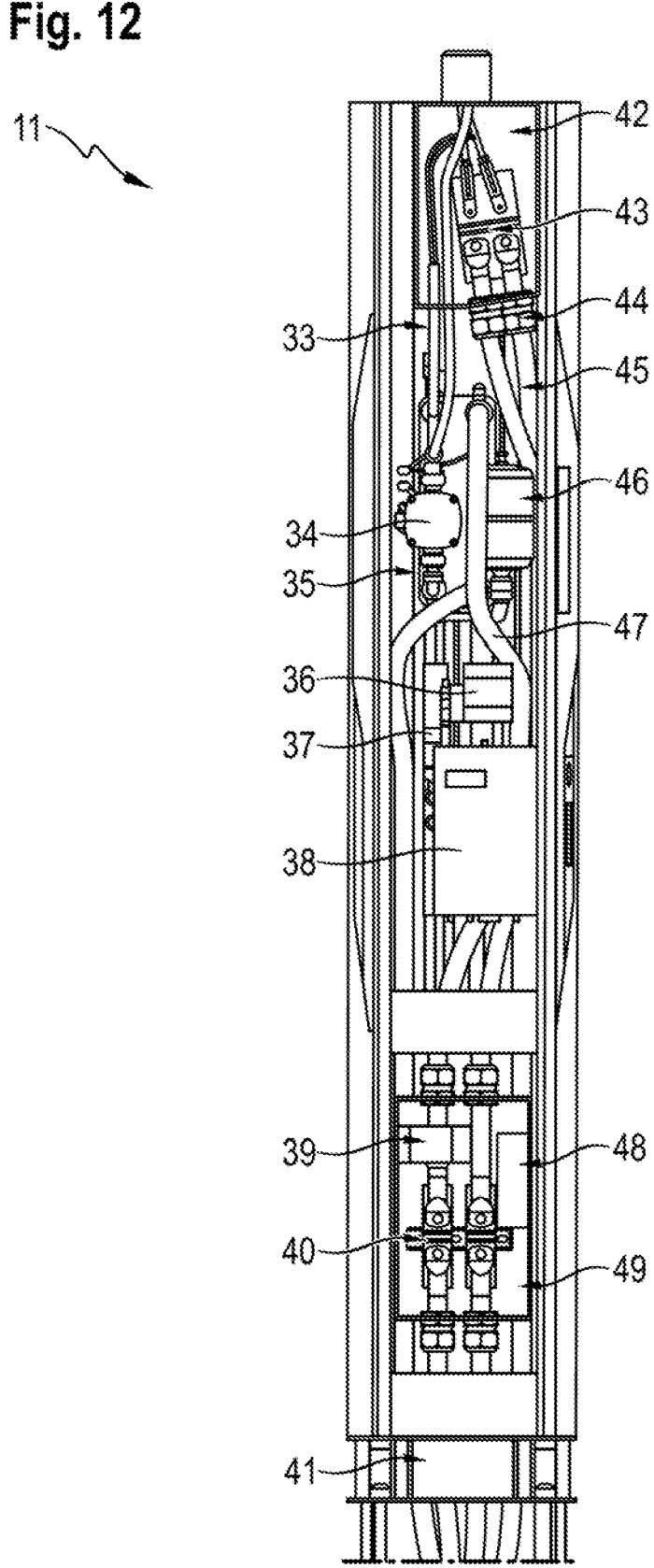
FIG. 12 shows the partial section through a charging column.

FIG. 12 illustrates the structure of a charging column (11) which, for its part, comprises a secondary cooling circuit (33), a further pump (34), a heat exchanger (35), a low-voltage supply arrangement (36) and an equalizing container (46). Here the secondary cooling circuit (33), which is filled with oil, chlorofluorocarbon (CFC) or some other non-aqueous coolant, fluidically connects the pump (34), which is fed from the low-voltage supply arrangement (36), to the equalizing container (46) and to the heat exchanger (35) which, in turn, thermally couples the primary cooling circuit (47) to the secondary cooling circuit (33). According to the figure, the charging column (11) further has a charging control unit (37), an energy meter (38) for measuring the direct-current consumption, a current sensor (39), a voltage sensor (48), two high-voltage terminals (40, 43), a cable screw connection (44) and DC voltage cables (45) which connect the first high-voltage terminal (40) to the second high-voltage terminal (43) via the charging control unit (37), the energy meter (38), the current sensor (39) and the voltage sensor (48), and, for their part, are fixed to one another by the cable screw connection (44). In this case, an upper connection region accommodates the second high-voltage terminal (43), whereas a lower connection region of said charging column, which lower connection region is located immediately above the steel base (41) of the charging column (11), has the first high-voltage terminal (40).

Figure 13:
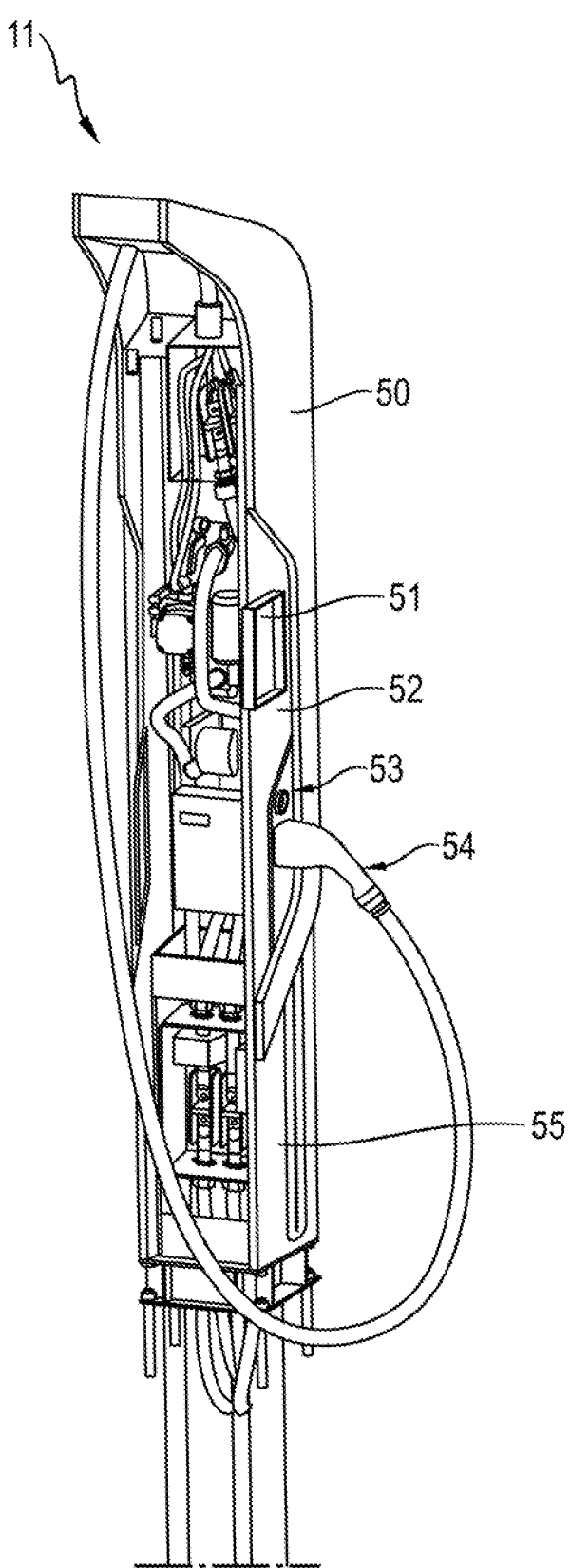
FIG. 13 shows a partially transparent view of the charging column according to FIG. 12.

FIG. 13 directs the attention of the viewer to the external appearance of the charging column (11), the housing (55) of said charging column, which housing is produced from an extruded aluminum profile, being surrounded by a cable mounting frame (50) in the form of a composite aluminum plate. Therefore, only the CCS charging plug (54) of said charging column, an emergency-off switch (53) which is adjacent to said CCS charging plug, and also a 25.4 cm display (51) which is supported by a black glass pane are accessible from the outside.

What is claimed is:

1. An installation for charging electric cars, the installation comprising charging columns, direct-current lines, rectifiers, three-phase alternating-current lines, a single-phase alternating-current line and a cooling arrangement,
   wherein the direct-current lines electrically connect the charging columns to the rectifiers,
   wherein the three-phase alternating-current lines electrically connect the rectifiers to a medium-voltage transformer, and
   wherein the single-phase alternating-current line electrically connects the medium-voltage transformer to the cooling arrangement.

2. The installation as claimed in claim 1, wherein the installation comprises a common primary cooling circuit and the primary cooling circuit fluidically connects the charging columns, the rectifiers and the cooling arrangement by a feed from the cooling arrangement to the charging columns and a return from the rectifiers to the cooling arrangement.

3. The installation as claimed in claim 2, wherein the cooling arrangement comprises a plurality of modules,
   wherein each module of the plurality of modules comprises a fan, a tank, a pump, a coolant inlet and a coolant outlet,
   wherein the coolant inlet fluidically connects a respective module of the plurality of modules to the rectifiers, and
   wherein the coolant outlet fluidically connects said respective module to the charging columns.

4. The installation as claimed in claim 3, wherein each module of the plurality of modules further comprises a switch cabinet with a main switch, handles and an electrical junction box, and the switch cabinet and the junction box are arranged between the handles.

5. The installation as claimed in claim 3, wherein each module of the plurality of modules has an air inlet and an air outlet, and the fan is arranged within a respective module in such a way that the air inlet and the air outlet are at a right angle in relation to one another.

6. The installation as claimed in claim 1, wherein each charging column comprises a secondary cooling circuit, a charging column pump, a heat exchanger, a low-voltage supply arrangement and an equalizing container, wherein the secondary cooling circuit fluidically connects the charging column pump to the heat exchanger and the equalizing container, wherein the heat exchanger thermally connects the primary cooling circuit to the secondary cooling circuit, and wherein the charging column pump is electrically connected to the low-voltage supply arrangement.

7. The installation as claimed in claim 1, wherein each charging column comprises a charging control unit, an energy meter, a current sensor, a voltage sensor, a first high-voltage terminal, a second high-voltage terminal, a cable screw connection and DC voltage cables, wherein the DC voltage cables connect the first high-voltage terminal to the second high-voltage terminal via the charging control unit, the energy meter, the current sensor and the voltage sensor, and wherein the cable screw connection connects the DC voltage cables to one another.

8. The installation as claimed in claim 7, wherein each charging column comprises a base, an upper connection region and a lower connection region, wherein the first high-voltage terminal is arranged in the lower connection region, wherein the second high-voltage terminal is arranged in the upper connection region, and wherein the base is adjacent to the lower connection region.

9. The installation as claimed in claim 1, wherein each charging column comprises a cable-routing frame, a display, a black glass pane, an emergency-off switch, a charging plug and a housing, wherein the cable-routing frame frames the housing and the black glass pane, and wherein the black glass pane supports the display.

10. The installation as claimed in claim 6, wherein the secondary cooling circuit comprises a non-aqueous coolant, and the coolant contains either oil or a synthetic fluid.

* * * * *